No. 609,216. Patented Aug. 16, 1898.
M. & A. SATTLEY.
COMBINED PLOW AND PLANTER.
(Application filed Apr. 13, 1898.)
(No Model.) 5 Sheets—Sheet 1.

Attest
Nora Graham.
Ina. Graham.

INVENTORS,
M. Sattley. and
A. Sattley.
by L. P. Graham
their attorney

No. 609,216. Patented Aug. 16, 1898.
M. & A. SATTLEY.
COMBINED PLOW AND PLANTER.
(Application filed Apr. 13, 1898.)
(No Model.) 5 Sheets—Sheet 2.
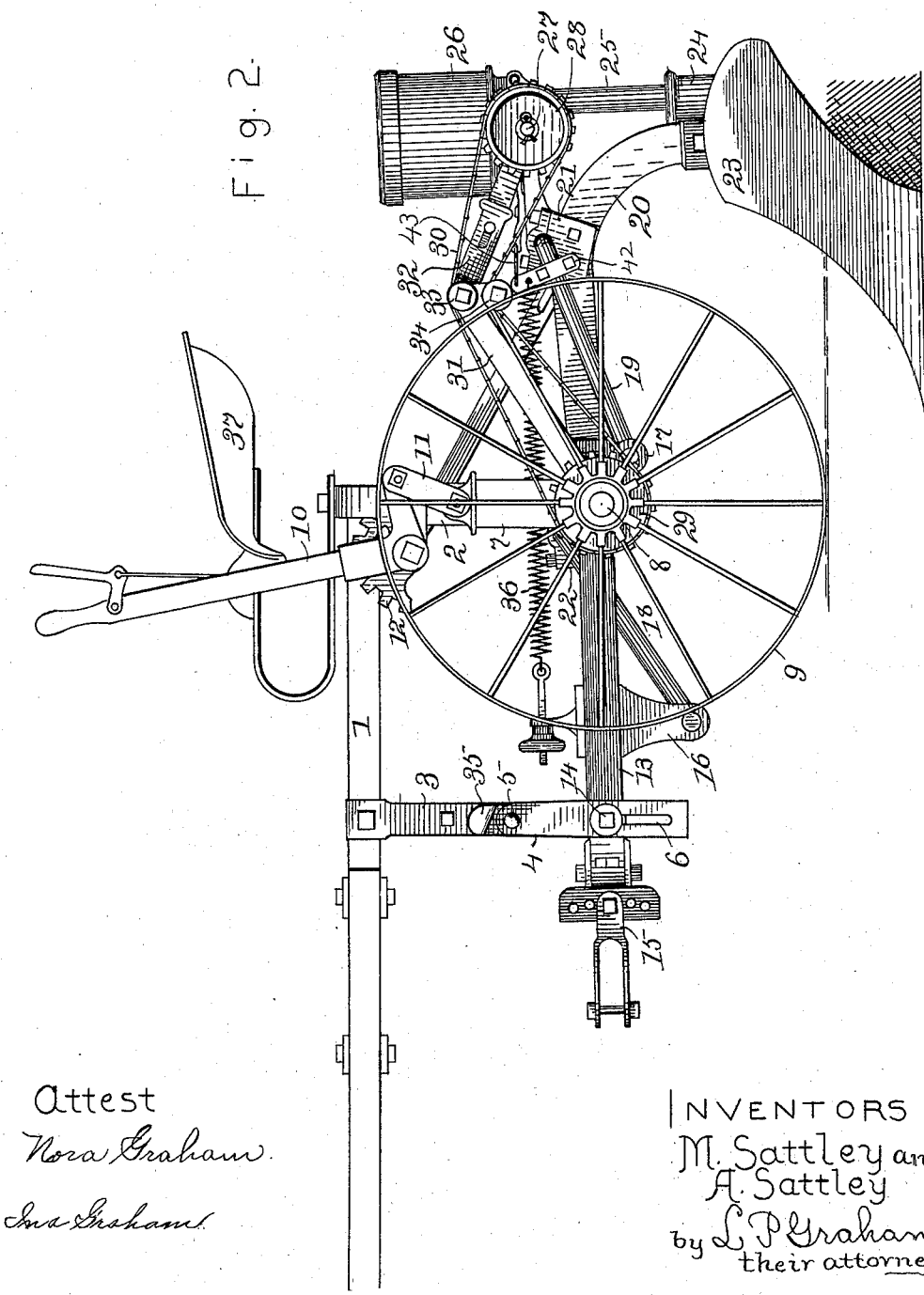
Attest
Nora Graham
Ina Graham
Inventors
M. Sattley and
A. Sattley
by L. P. Graham
their attorney

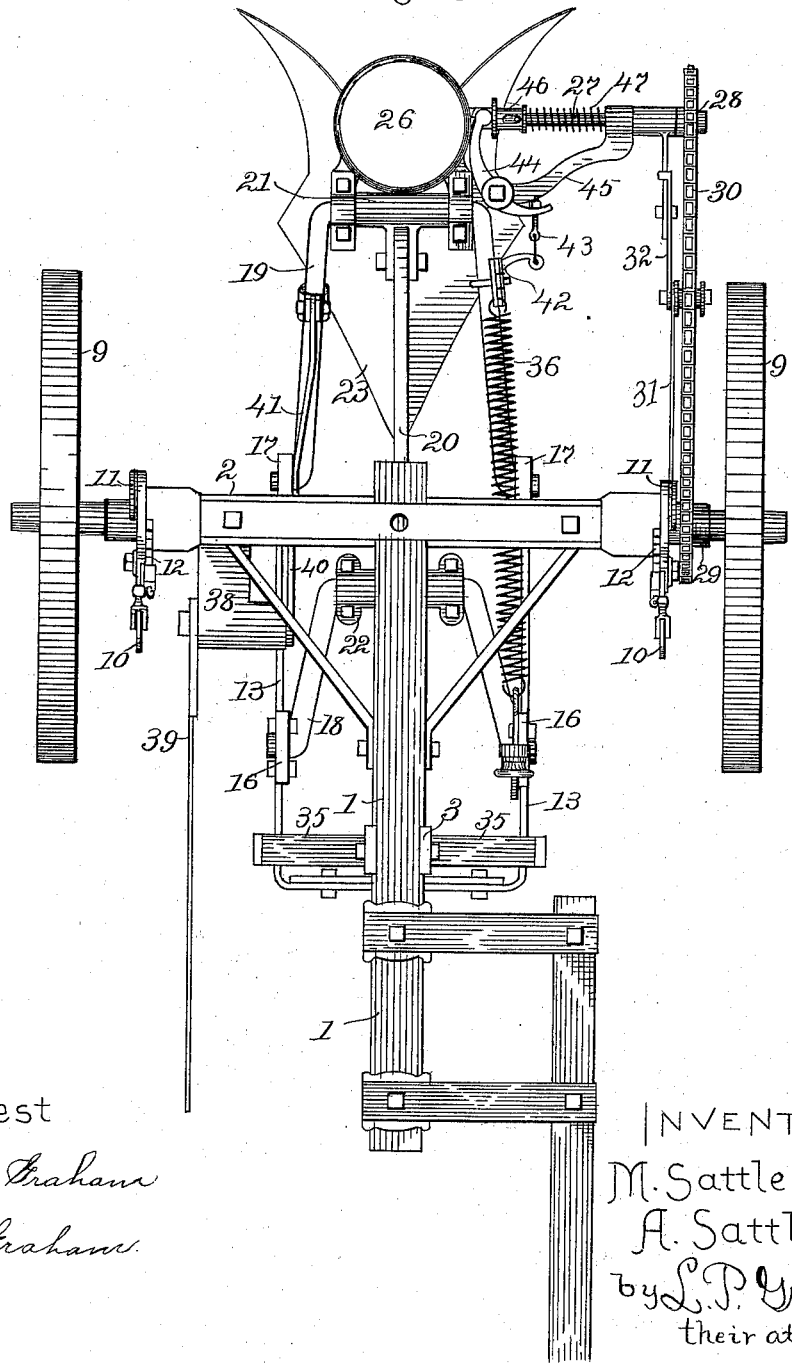

No. 609,216. Patented Aug. 16, 1898.
M. & A. SATTLEY.
COMBINED PLOW AND PLANTER.
(Application filed Apr. 13, 1898.)
(No Model.) 5 Sheets—Sheet 4.
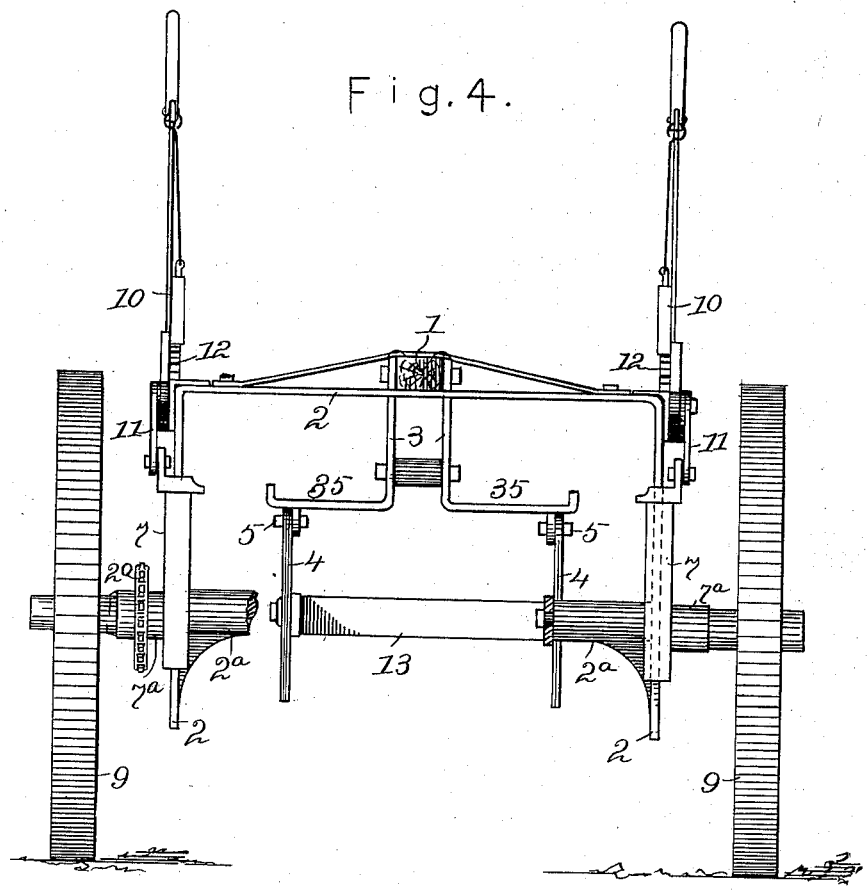
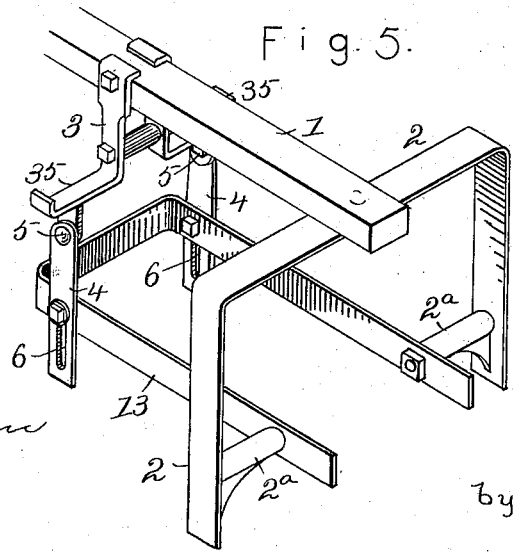
Attest
Nora Graham
Iva Graham
INVENTORS
M. Sattley and
A. Sattley
by L. P. Graham
their attorneys No. 609,216. Patented Aug. 16, 1898.
M. & A. SATTLEY.
COMBINED PLOW AND PLANTER.
(Application filed Apr. 13, 1898.)
(No Model.) 5 Sheets—Sheet 5.

Attest
Nora Graham
Ana Graham

INVENTORS
M. Sattley and
A. Sattley.
by L. P. Graham
their attorney

THE NORRIS PETERS CO., PHOTO-LITHO., WASHINGTON, D. C.

UNITED STATES PATENT OFFICE.

MARSHALL SATTLEY AND ARCHIBALD SATTLEY, OF SPRINGFIELD, ILLINOIS, ASSIGNORS TO THE SATTLEY MANUFACTURING COMPANY, OF SAME PLACE.

COMBINED PLOW AND PLANTER.

SPECIFICATION forming part of Letters Patent No. 609,216, dated August 16, 1898.

Application filed April 13, 1898. Serial No. 677,498. (No model.)

*To all whom it may concern:*

Be it known that we, MARSHALL SATTLEY and ARCHIBALD SATTLEY, of Springfield, in the county of Sangamon and State of Illinois, have invented a certain new and useful Combined Plow and Planter, of which the following is a specification.

The invention relates in part to the plow mechanism, in part to the planting mechanism, and in part to the combination of the two. It is exemplified in the structure hereinafter described, and it is defined in the appended claims.

Figure 1:
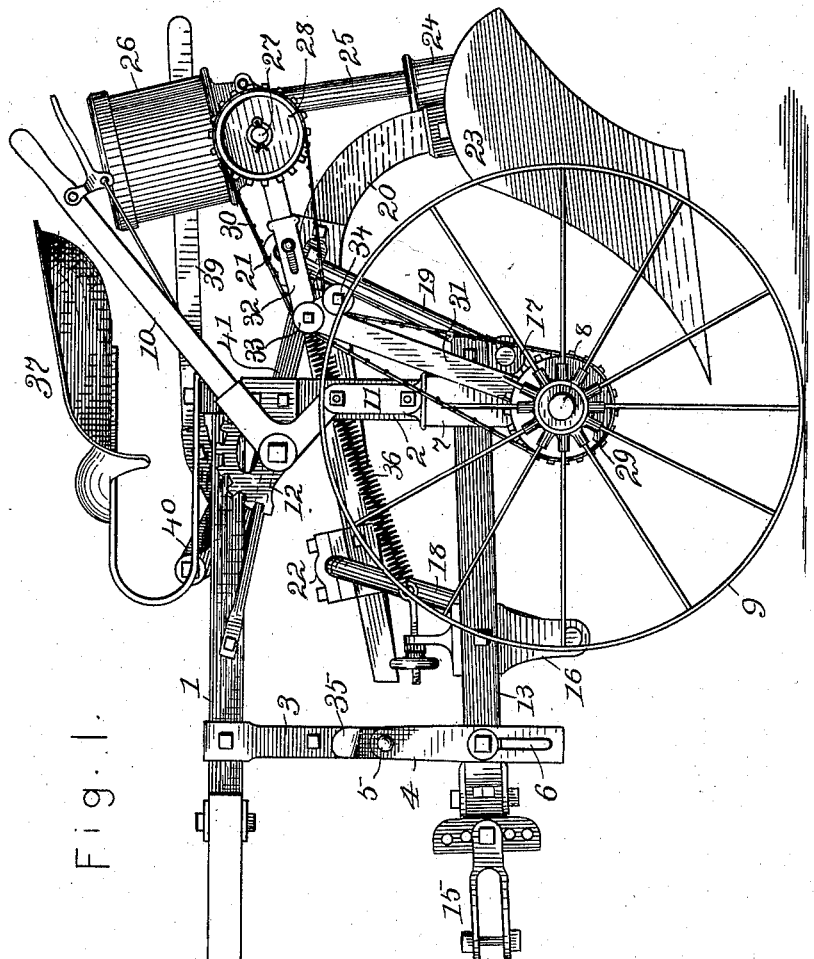
Figure 6:
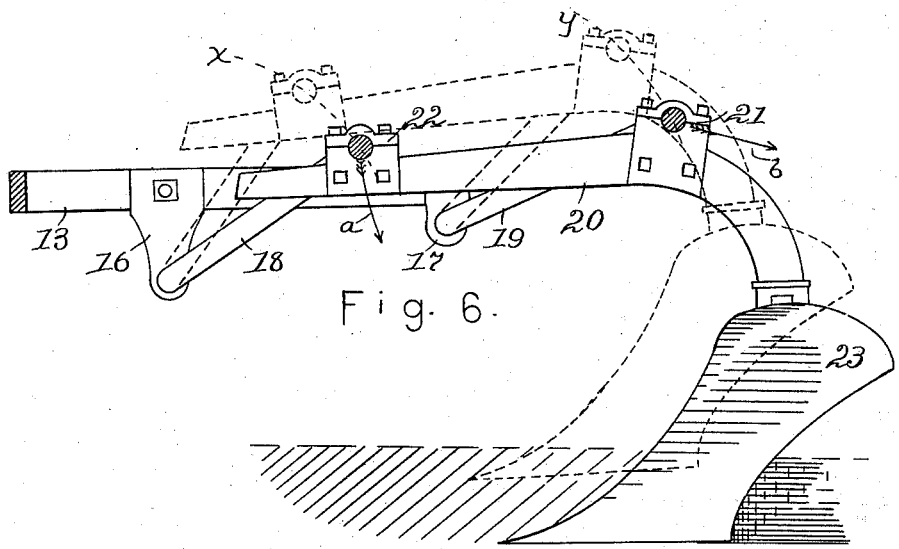
Figure 7:
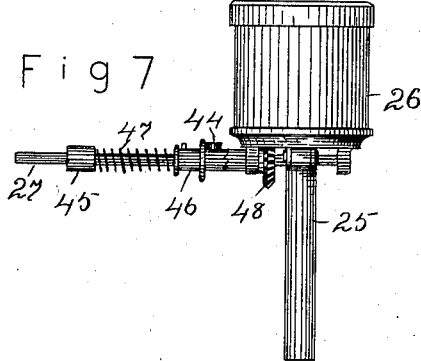
Figure 8:
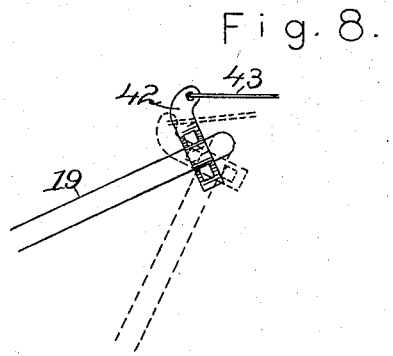

In the drawings forming part of this specification, Figure 1 is a side elevation of an embodiment of our invention, showing the plow raised from contact with the ground. Fig. 2 is a similar view showing the plow in operative position. Fig. 3 is a plan of the device with the seat omitted. Fig. 4 is a rear elevation of the frame of the device, parts of which are broken away to show details of construction. Fig. 5 is an isometrical perspective representation of the guiding-frame and the draft-frame. Fig. 6 is a diagram exemplifying the swing of the plow upward and downward. Fig. 7 is a detail of the rear of the seedbox and the driving mechanism therefor. Fig. 8 is a detail illustrative of the swing of one of the plow-supporting bails and the effect thereof on the clutch-shifter of the planter.

The guiding-frame consists of an arched frame or bar, as 2, provided with carrying-wheels, as 9, a tongue, as 1, fastened stiffly to the arched bar, and links, as 4, suspended from the tongue in front of the arched bar. The links are preferably connected with the tongue through frame 3, which is provided with foot-rests 35. They connect pivotally at 5 with lugs depending from the foot-rests, and their lower ends are slotted vertically, as shown at 6. The wheels are connected with the vertical members of the arched frame in a manner to permit vertical adjustment thereon, and the provision for such connection consists of sleeves 7, which embrace the outer surfaces and edges of the legs of the arched frame, and spindles 8, rigidly projecting outward from the sleeves. The means for adjusting the wheels with relation to the arched frame comprises segmental racks 12, fixed onto the upper ends of the legs of frame 2, lock-levers 10, pivotally connected with the racks concentric therewith, such levers having L or bell-crank extensions, and links, as 11, connecting the L extensions of the levers with sleeves 7. The guiding-frame is also the carrying-frame, as it supports the plowing and planting mechanism when the same is out of operation, and it has a seat 37 for the driver, located above the arched bar 2.

The draft-frame 13 preferably consists of a bar bent to form three sides of a rectangle. Its rear ends are pivoted on studs 2ª, which project inward rigidly from the legs of frame 2. Its front cross-bar has a draft-hitch, as 15, and it has pins or bolts that extend through the slots 6 of links 4. The effect of the specified connections between the draft-frame and the guiding and carrying frame is to hold the rear end of the draft-frame continuously in certain corelation with the wheel-frame, while permitting a limited amount of independent vertical swing in the front end of the draft-frame. This permits the plow in the draft-frame to pitch downward or upward to an extent sufficient to accommodate ordinary irregularities in the surface of the ground. It relieves the tongue from all downward pull in ordinary operation, and it restrains the draft-frame and the plow therein from such extremes of vertical pitch as would make the plow ineffective.

The plow 23 may be of any desired form, though when used in connection with planting mechanism it is preferably of the double-moldboard or lister construction. It has a beam 20 extending upward and forward in the usual manner, and bearings 21 and 22 are secured one to the rear portion and the other to the front portion of the horizontal extension of the beam.

A pair of brackets 16 are secured to opposite sides of the front portion of the draft-frame 13. Another pair of brackets 17 are secured one to each side of the rear end of the draft-frame.

A bail 18 extends through bearing 22 and has its ends journaled in brackets 16, and another bail 19 extends through bearing 21 and has its ends journaled in brackets 17. The bails incline upward and backward from their pivots in the draft-frame to their bearings in the plow-beam, but the forward bail inclines upward to a greater extent than does the rear one, is slightly shorter, and is pivoted lower, and at a certain point in the downward movement of the plow-beam the diversity of inclination, augmented somewhat by the diversity of length and location of pivot, develops a lock that prevents farther downward movement of the beam.

In Fig. 6 the arcs defined by dotted lines $x$ and $y$ designate the lines of travel of the swinging ends of the bails, and the position of the plow-beam shown in solid lines is the locked position. The front bearing of the beam travels downward and backward to an approximately equal extent, while the rear bearing travels downward to a much greater extent than it travels rearward, and so a line is eventually reached beyond which farther travel of the entire beam downward is impossible. When this line is reached, the plow is in the ground and the backward pull of the plow develops a stress on the different bearings in approximately the directions indicated by arrows $a$ and $b$ in Fig. 6. The pull on bearing 21 is backward and downward to an extent to hold bail 19 firmly depressed, and the tendency of the beam is to pitch downward with bearing 21 for a pivot and to carry bearing 22 in the direction of arrow $a$; but arrow $a$ is not in line with arc $x$, which is the only possible line of travel of bearing 22, and so the lock is effected. In raising the plow the bearing 22 travels slightly slower than does bearing 21, thus permitting the beam to follow the diverging paths of the two bearings, and in lowering the plow this proceeding is reversed, the converging paths being followed as far as their convergence will permit.

The means preferably employed to raise the plow consist of a lever 39, pivoted in bearing 38 and having an arm 40, and a link 41, connecting the arm with bail 19. The link is a lifter merely. It may be slotted to permit the bail to rise freely, and the lever and arm are so disposed as to hold the plow raised without assistance, though this is immaterial to this invention. The lever and link are preferably aided in raising the plow by a spring 36, which connects with bail 19 and with the draft-frame and which is put under tension by lowering the plow.

In operating the plow the driver sits over the arched bar with his weight balanced thereon, so as to relieve the tongue from downward pressure on the team. The draft-frame is pivotally connected with the arched bar, and its front end swings vertically to a considerable extent. The draft-hitch is made with the draft-frame direct, so that the plow may pitch forward or backward in following ordinary depressions or elevations without affecting the tongue, and the plow may rise in the draft-frame when the wheels strike depressions and so automatically keep the depth of plowing uniform.

The depth of the furrows is fixed by adjusting sleeves 7 on the legs of the arched bar 2, and the plow is raised by lever 39 and lowered by its own weight when the lever is thrown forward.

The planting mechanism consists of a seedbox 26, supported from the plow and provided with the customary or any suitable seed-dropping device, a shaft 27, having a gear-wheel 48 in Fig. 7, which drives the seed-dropper, a sprocket-wheel 28 on shaft 27, a sprocket-wheel 29 on a hub of a carrying-wheel 9, a chain 30, connecting sprocket-wheel 29 with sprocket-wheel 28, and a tube 25 to convey the grain from the seedbox to the furrow formed by the plow. The tube 25 preferably terminates in a sleeve 24 in the rear of and secured to the plow, and a suitable covering device should be provided to make the planter complete.

In adjusting the plow to cut furrows of different depths and in raising and lowering the plow the distance between the sprocket-wheels is varied somewhat, and special provision is needed to make the chain conform to the changed conditions.

The means employed to take up and let out the chain acts automatically, and it consists of a pair of bars 31 and 32, joined together pivotally and pivoted one on the shaft 27 and the other concentric with wheel 29. The combined length of the bars is considerably greater than the distance from one sprocket-wheel to the other under any circumstances, and they form an upward extended elbow at their conjunction.

Pulleys 33 and 34 are carried by bar 31 at its conjunction with bar 32, one being placed above the other, and the upper run of the chain is carried by the upper pulley and the lower run by the lower pulley.

When the distance between the sprocket-wheels is changed by shifting the wheels or the plow, the elbow formed by the bars rises or falls correspondingly and the pulleys take up or let out chain to meet the changed conditions. This device would be operative if the elbow were pointed downward instead of upward and the chain run against opposite sides of the pulleys; but the elbow must exist, and its angle should not be very obtuse in order to get best results. The bar 32 is preferably extensible, as shown in the drawings.

When the plow is raised from contact with the ground, the planter should cease to operate. To provide for this result, the gear-wheel 48, that drives the seed-dropper, is mounted loosely on shaft 27. A clutch-sleeve 46 is splined on the shaft of the gear-wheel and is provided with teeth or extensions adapted to engage corresponding teeth or extensions in the face of the gear-wheel. A spring 47 is made to bear against the clutch-sleeve and hold the sleeve yieldingly in engagement with the gear-wheel. An L or bell-crank lever 44 is fulcrumed on extension 45 of bracket 21, with one end engaging an annular groove in the clutch-sleeve. An arm 42 is fastened onto bail 19 and extended upward therefrom, and a link 43 connects the upper end of arm 42 with the end of lever 44 not in engagement with the clutch-sleeve. As the bail is raised, the arm 42 swings forward with relation to the seedbox and turns the lever on its fulcrum in the proper direction to force the clutch-sleeve out of engagement with the gear-wheel, and so long as this condition continues the rotary motion of the shaft 27 will not be imparted to the gear-wheel, and the seed-dropping mechanism will consequently remain at rest. In Fig. 8 the effect of the swing of the bail is shown, though it will be understood that in addition to the changes of position indicated the entire mechanism involved in this feature of the operation is carried upward and forward as the bail is raised.

The arm 45 extends sidewise and rearward from bracket 21, forming a support for lever 44 and providing a bearing for the extended end of shaft 27.

What we claim is—

1. In a plow, the combination of an arched wheel-frame and a plow-carrying draft-frame swung on horizontal pivots in the wheel-frame, substantially as set forth.

2. In a plow, the combination of an arched wheel-frame having a tongue, and a plow-carrying draft-frame swung on horizontal pivots in the wheel-frame, substantially as set forth.

3. In a plow, the combination of an arched wheel-frame having a stiff tongue, a seat and a foot-rest, and a plow-carrying draft-frame swung on horizontal pivots in the wheel-frame, substantially as set forth.

4. In a plow, the combination of an arched wheel-frame having a stiff tongue and a driver's seat, a foot-rest supported from the tongue in front of the seat, a plow-carrying draft-frame swung at its rear end on horizontal pivots fixed to the wheel-frame and connections between the foot-rest and the front end of the draft-frame whereby vertical swing of the draft-frame is limited, substantially as set forth.

5. In a plow, the combination of an arched wheel-frame having a stiff tongue and a driver's seat, a foot-rest supported from the tongue in front of the seat, a plow-carrying draft-frame swung at its rear end on horizontal pivots fixed to the wheel-frame and extended under the foot-rest, slotted links depending pivotally from the foot-rest and pins on the draft-frame extending through the slots of the links, substantially as set forth.

6. In a plow, the combination of an arched wheel-frame, a draft-frame pivoted in the wheel-frame in a manner permitting independent vertical swing, and a plow carried by the draft-frame in a manner permitting a limited amount of independent vertical motion in the plow, or in the draft-frame, substantially as set forth.

7. In a plow, the combination of an arched wheel-frame, a draft-frame pivoted to swing vertically in the wheel-frame, and a plow swung in the draft-frame and having a backward lowering motion and a forward rising motion, substantially as set forth.

8. In a plow, the combination of an arched wheel-frame, a draft-frame pivoted to swing vertically in the wheel-frame, two bails pivoted in the draft-frame one in front of the other and extended upward and rearward, the rearward inclination of the rear bail being greater than the rearward inclination of the front bail, and a plow the beam whereof is swung on the bails, substantially as set forth.

9. In a plow, the combination of an arched frame having a stiff tongue and a driver's seat, wheels adjustable on the arched frame, a foot-rest carried by the tongue in front of the seat a draft-frame swung at its rear end on horizontal pivots fixed to the arched frame, motion-limiting connections extending from the foot-rest to the front end of the draft-frame, and a plow swung in the draft-frame and having a limited amount of vertical motion independent of such draft-frame, substantially as set forth.

10. In a combined plow and planter, the combination of a wheel-frame, a seedbox shiftable to and from the spindles of the wheels a drop-actuating sprocket-wheel movable with the seedbox, a sprocket-wheel on a carrying-wheel, a connection between the sprocket-wheels composed of two hinged bars pivotally connected and forming an angle at their conjunction, guide-pulleys at the conjunction of the bars and a chain running around the sprocket-wheels and over the guide-pulleys, substantially as set forth.

11. The combination with the lift-link 19, the plow-beam carried thereon and the seedbox carried by the beam, of the drive mechanism for the seed-dropper including a clutch, the lever engaging the shiftable clutch member, the arm extending upward from the bail and the link connecting the arm with the clutch-shifting lever, whereby the clutch is shifted and the drop thrown out of operation when the bail is raised, substantially as set forth.

In testimony whereof we have signed our names in the presence of two subscribing witnesses.

MARSHALL SATTLEY.
ARCHIBALD SATTLEY

Witnesses:
JAMES H. MATHENY,
MARY A. CHRISTY.